(12) United States Patent
Docking

(10) Patent No.: US 10,621,770 B1
(45) Date of Patent: Apr. 14, 2020

(54) METHOD AND SYSTEM FOR LABELING LINE FEATURES IN ELECTRONIC MAPS

(71) Applicant: ForeFlight LLC, Houston, TX (US)

(72) Inventor: Christopher Andrew Docking, Shropshire (GB)

(73) Assignee: ForeFlight LLC, Houston, TX (US)

( * ) Notice: Subject to any disclaimer, the term of this patent is extended or adjusted under 35 U.S.C. 154(b) by 0 days.

(21) Appl. No.: 16/286,171

(22) Filed: Feb. 26, 2019

(51) Int. Cl.
   *G06T 11/60* (2006.01)
   *G09B 29/10* (2006.01)

(52) U.S. Cl.
   CPC ............ *G06T 11/60* (2013.01); *G09B 29/106* (2013.01)

(58) Field of Classification Search
   CPC ............................... G06T 11/60; G09B 29/106
   See application file for complete search history.

(56) References Cited

U.S. PATENT DOCUMENTS 9,928,572 B1 * 3/2018 Magouyrk ............... G06T 3/60
2001/0034588 A1 * 10/2001 Agrawals ............... G01C 21/36
                                                            703/2

* cited by examiner

*Primary Examiner* — Chong Wu
(74) *Attorney, Agent, or Firm* — Ferguson Braswell Fraser Kubasta PC (57) ABSTRACT

A method for labeling line features in an electronic map involves updating a labeling of a previously rendered map view to obtain a labeling for a current map view, including obtaining candidate line features associated with the current map view, and for a candidate line feature of the candidate line features, making a determination that a label associated with the candidate line feature is unique in the current map view. The method further involves, based on the determination, identifying at least one visible span of the candidate line feature, and based on the at least one visible span, obtaining ranked candidate positions for the label. The method also includes selecting, from the ranked candidate positions, a position for the label in the current map view, and rendering a frame for a display, the frame comprising the current map view, the candidate line features, and the label at the position.

20 Claims, 9 Drawing Sheets

METHOD AND SYSTEM FOR LABELING LINE FEATURES IN ELECTRONIC MAPS

BACKGROUND

Features shown in maps are frequently labeled with the name of the feature and/or with information associated with the feature. Often, in electronic maps, static labeling of features is performed. Using the static labeling technique, each label has a predefined static location of the label. In other words, the label is set to particular geographic coordinates. Thus, when the map is rendered and displaced, the labels are located at the predefined static location. To handle various user interface operations, such as zooming, panning, movement, etc., the same line feature may have multiple labels defined at different static locations along the line feature. Thus, as the user pans in, more of the static labels are presented for the same line feature. While labels provide information, labels also visually complicate the map and hide underlying portions of the map. Accordingly, when rendering an electronic map, it may desirable to minimize the number of redundant labels and to place labels to improve legibility.

SUMMARY

In general, in one aspect, one or more embodiments relate to a method for labeling line features in an electronic map. The method includes updating a labeling of a previously rendered map view to obtain a labeling for a current map view including obtaining candidate line features associated with the current map view, and for a first candidate line feature of the candidate line features, making a first determination that a first label associated with the first candidate line feature is unique in the current map view. The method further includes, based on the determination, identifying at least one visible span of the first candidate line feature, based on the at least one visible span, obtaining ranked candidate positions for the first label, and selecting, from the ranked candidate positions, a first position for the first label in the current map view. The method further includes rendering a frame for a display. The frame includes the current map view, the candidate line features, and the first label at the first position.

In general, in one aspect, one or more embodiments relate to a system for labeling line features in an electronic map. The system includes a computer processor, and instructions executing on the computer processor, causing the system to update a labeling of a previously rendered map view to obtain a labeling for a current map view. Updating the labeling includes obtaining candidate line features associated with the current map view, and for a first candidate line feature of the plurality of candidate line features, making a first determination that a first label associated with the first candidate line feature is unique in the current map view. The instructions further cause the system to, based on the determination, identify at least one visible span of the first candidate line feature, based on the at least one visible span, obtain a plurality of ranked candidate positions for the first label, and select, from the ranked candidate positions, a first position for the first label in the current map view. The instructions further cause the computer processor to render a frame for a display, the frame including the current map view, the candidate line features, and the first label at the first position.

In general, in one aspect, one or more embodiments relate to a non-transitory computer readable medium including computer readable program code for causing a computer system to update a labeling of a previously rendered map view to obtain a labeling for a current map view. Updating the labeling includes obtaining candidate line features associated with the current map view, and for a first candidate line feature of the candidate line features, making a first determination that a first label associated with the first candidate line feature is unique in the current map view. Based on the determination, the updating includes identifying at least one visible span of the first candidate line feature, based on the at least one visible span, obtaining ranked candidate positions for the first label, and selecting, from the ranked candidate positions, a first position for the first label in the current map view. The instructions further cause the computer system to render a frame for a display, the frame including the current map view, the candidate line features, and the first label at the first position.

Other aspects of the disclosed invention will be apparent from the following description and the appended claims.

DETAILED DESCRIPTION

Specific embodiments of the disclosed technology will now be described in detail with reference to the accompanying figures. Like elements in the various figures may be denoted by like reference numerals and/or like names for consistency.

The following detailed description is merely exemplary in nature, and is not intended to limit the disclosed technology or the application and uses of the disclosed technology. Furthermore, there is no intention to be bound by any expressed or implied theory presented in the preceding technical field, background, brief summary or the following detailed description.

In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the invention enable a labeling of line features in electronic maps. A map is a visual representation of a geographic area, whereby locations of items shown in the map are defined by the locations of the items in the geographic area. A map includes line features. Line features may include, but are not limited to freeways, roads, railroad lines, rivers, boundaries, geographical borders, airspace boundaries, etc. Various examples for line features are provided in FIGS. 2A and 2B. To enable a user to recognize and interpret line features shown in a map, the line features may be labeled. In electronic maps, the use of static labels may be suboptimal because the map content being shown to a user in a map view may change as a result of zooming, panning, movement, etc.

In one or more embodiments of the disclosure, labels are dynamically assigned to line features. For a current map view displayed to a user, a single label may be shown per line feature. For each of the line features appearing in a map view, the label may be placed at a location considered ideal, as discussed in detail below. Considerations affecting the label placement include achieving legibility, avoiding clutter, etc., resulting in a systematic label placement in accordance with one or more embodiments. Once placed, a label may be kept stationary relative to the labeled line feature until a change in the map view triggers an updated label placement.

In one or more embodiments of the disclosure, the map view is based on a map, such as a topographical map, a road map, an aeronautical chart, etc. The map view may be displayed on a display screen that is associated with a navigational device, e.g., in a vehicle, an aircraft, etc. In one or more embodiments, the map view is part of an integrated flight application. An integrated flight application may include various components that may serve an aircraft crew, e.g., pilots, co-pilots, etc. These components may include various types of maps (visual flight rules (VFR) sectionals, VFR and instrument flight rules (IFR) en-route charts, airport diagrams, terminal area charts, world aeronautical charts, surface maps showing terrain features, streets, weather charts, etc.) that may be displayed. The map view may be actively controlled by a user who may zoom in, out, pan, etc. Further, the map view may update based on a changing current location of the user. For example, the map view may include an own-ship display indicting the current position of an aircraft on the moving map as the flight is progressing.

Figure 1:
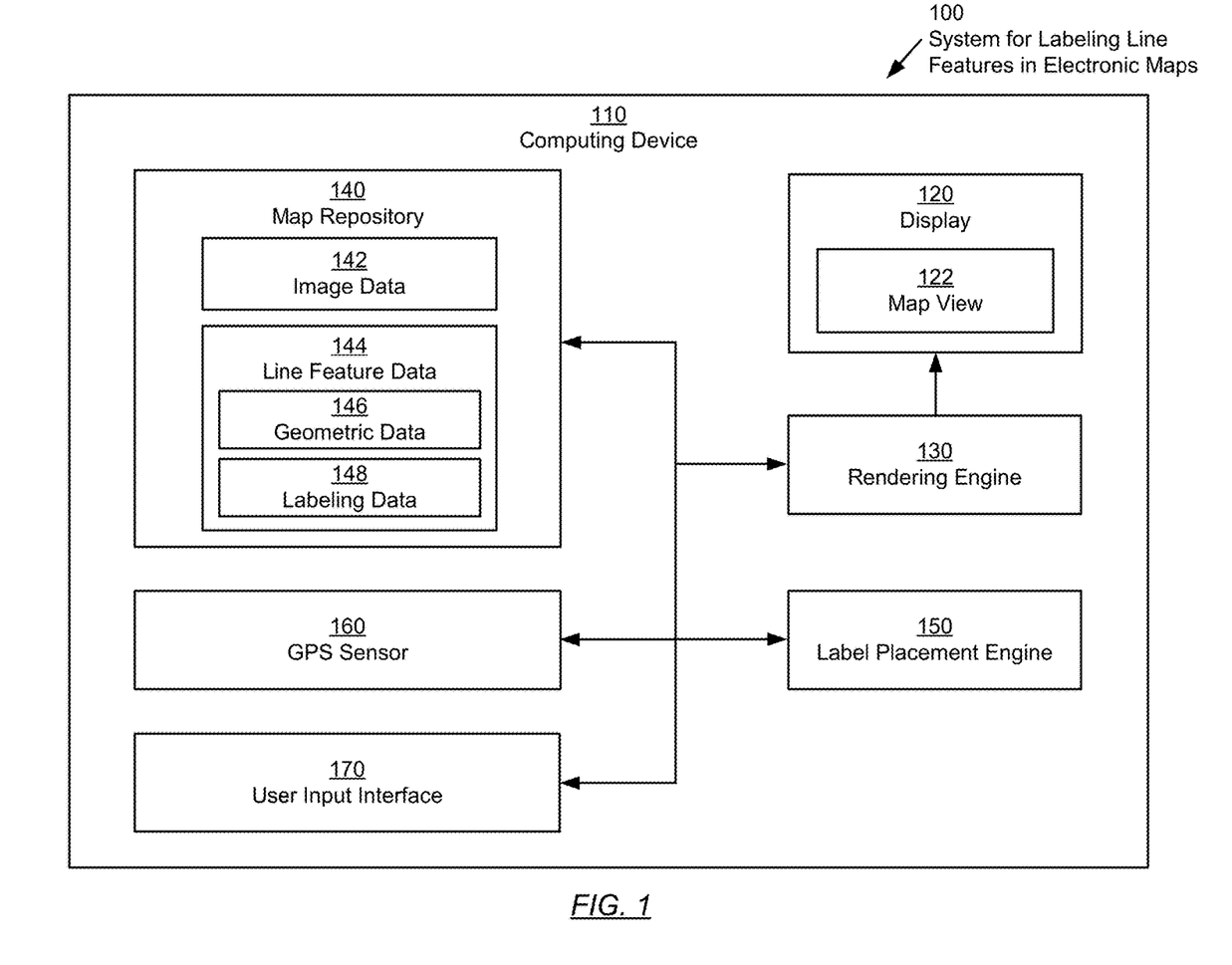
FIG. 1 shows a block diagram of a system for labeling line features in electronic maps, in accordance with one or more embodiments of the disclosure.

Turning to FIG. 1, a block diagram of a system for labeling line features in electronic maps (100), in accordance with one or more embodiments of the disclosure, is shown. The system (100) may be based on a computing device (110) and may include a display (120), a rendering engine (130), a map repository (140), a label placement engine (150), a global positioning system (GPS) sensor (160), and a user input interface (170). Each of these components is subsequently described.

The computing device (110) may be a portable computing device, for example, a tablet computer, a smartphone, or a laptop. Exemplary configurations of computing devices in accordance with one or more embodiments of the disclosure are described below, with reference to FIGS. 8A and 8B. As another example, a permanently or semi-permanently installed computing device may be used instead of the portable computing device, without departing from the disclosure. For example, in one or more embodiments of the disclosure, the computing device may be installed in a cockpit of an airplane or in a dashboard of a vehicle. The computing device (110), in accordance with one or more embodiments of the disclosure, is configured to execute a set of machine-readable instructions (stored on a computer-readable medium) which, when executed by the computing device (110), perform one or more of the operations described in the flowcharts of FIGS. 3, 4, 5, 6, and 7. The computing device (110) further enables user interaction via the display (120) and via the user input interface (170).

The display (120) of the computing device (110) may be a screen, such as a liquid crystal display (LCD), light emitting diode (LED) or organic LED (OLED) screen or any other type of display that supports visual content to be shown to a user. Specialized display technologies or accessories may further be used, e.g., screens that are customized for nighttime use. The display (120) may be used as the output interface to a user (e.g. a pilot) and may display a map view (122) as introduced in FIGS. 2A and 2B, and/or additional symbolic or text content, etc.

The rendering engine (130) may be hardware and/or software configured to generate the map view (122) to be displayed to the user in the display (120). The rendering engine may include software instructions that enable the rendering of the current map view, line features, and labels to be shown in the current map view. The operations performed by the rendering engine (150) are described below with reference to the flowcharts of FIG. 3.

The map repository (140) may store one or more raster images and/or vector images of maps to be displayed to the user. The map repository (140) may be structured in any form suitable for storing raster and/or vector images. Data stored in the map repository (140) may, thus, include image data (142) for the raster images and line feature data (144). The line feature data (144) may include geometric data (146) and labeling data (148) for each of the line features in the line feature data. The geometric data (146) may include geometric descriptions of the line features or of approximations of the line features (e.g., in case of non-regular line features such as rivers). The geometric description may be provided in vector format, describing shape and location of the line features. The labeling data (148) may provide descriptive content associated with the line features. The labeling data (148) may include text or symbolic data associated with the line features. The labeling data (148) may include, but is not limited to, names (e.g., the name of a river or street), altitudes (e.g., of airspace boundaries), warnings, and/or any other kind of information associated with line features. The labeling data may be selectively displayed in proximity to the associated line features, as discussed below. The map repository may be located on a hard disk drive, on a flash drive or on any other non-volatile storage medium. Alternatively, parts of the map repository or the entire map repository may be stored in volatile memory. Further, parts of the map repository or the entire map repository may be dynamically loaded when map repository data is required, e.g., when a user zooms into or out of a map, etc.

The label placement engine (150) may include software instructions that enable the placement of labels for line features being shown in a map view. The operations performed by the label placement engine (150) are described below with reference to the flowcharts of FIGS. 4, 5, 6, and 7.

The GPS sensor (160) may provide location information of the aircraft or vehicle to the system (100). The location information may be used to update the map view (122), based on the current location, determined by the GPS sensor (160). The GPS sensor may be a sensor built into the computing device (110) or an external sensor that may be installed on the aircraft or vehicle being used.

The user input interface (170) may enable a user to control the system (100). The user input interface, in accordance with one or more embodiments, includes a touch interface such as a touch screen. The user interface (170) may enable a user to interact with the map view (122) using zoom, pan, and/or rotate operations, etc.

While FIG. 1 shows a configuration of components, other configurations may be used without departing from the scope of the disclosure. For example, various components may be combined to create a single component. As another example, the functionality performed by a single component may be performed by two or more components. Accordingly, for at least the above-recited reasons, disclosed embodiments should not be considered limited to the specific arrangements of components and/or elements shown in FIG. 1.

Figure 2A:
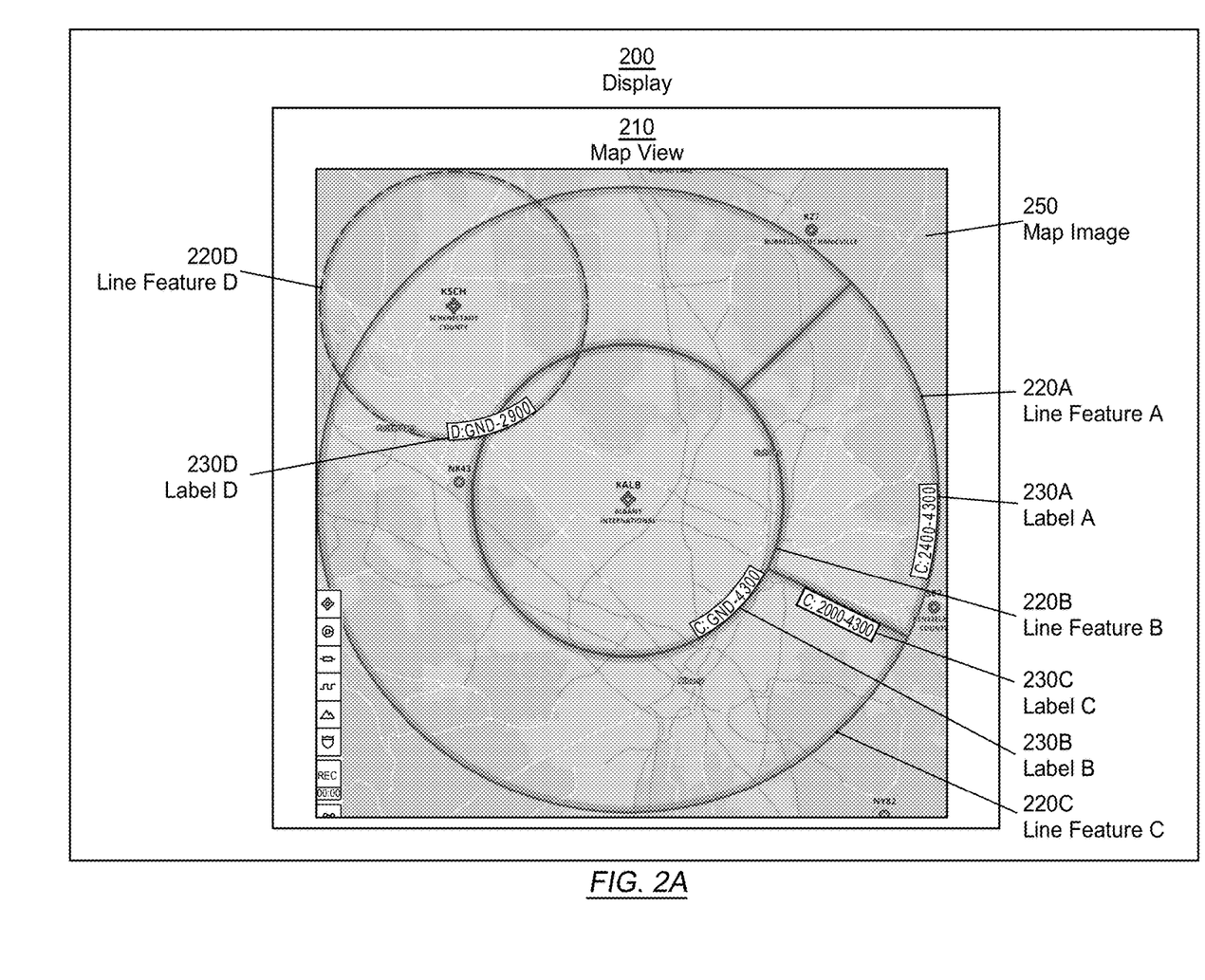
FIGS. 2A and 2B show examples of a display output of a system for labeling line features, in accordance with one or more embodiments of the disclosure.

Turning to FIG. 2A, a first example of a display (200) showing a map view (210), in accordance with one or more embodiments, is illustrated. The map view (210) represents a section of a map image (250) that is displayed in the display (200). Multiple line features (220A, 220B, 220C, 220D), and associated labels (230A, 230B, 230C, 230D) are superimposed.

The map view (210) may be a section of any type of map image (250) that is currently displayed. The map image (250) may be based on a raster image or vector representation of a map, stored in the map repository (140). In the example of FIG. 2A, the map image (250) is based on an aeronautical chart. Those skilled in the art will appreciate that the map image (250) may be based on any type of map.

The line features (220A, 220B, 220C, 220D) may be features in the map image (250) such as roads, rivers railway lines, airspace boundaries, international borders, county lines, etc. Any feature that may be of relevance to a user of the map may be considered a line feature. In the example of FIG. 2A, the line features (220A, 220B, 220C, 220D) shown in the map view (210) are airspace boundaries. Line features A, B, and C (220A, 220B, 220C) identify the boundaries of the class C airspace surrounding Albany international airport (KALB), and line features D (220D) identifies the boundary of the class D airspace surrounding Schenectady county airport (KSCH).

In one or more embodiments, line feature data (144) is available for each of the line features (220A, 220B, 220C, 220D). The line feature data (144) may include a geometric description of the line features or of approximations of the line features (e.g., in case of non-regular line features such as rivers). The geometric description may be provided in vector format, allowing geometric operations to be performed on the line features. For example, the geometric description may enable an algorithm to determine an overall size or length of a line feature, a displayed size or length of the line feature as currently displayed in the map view (210), a shape of the line feature, a center of the line feature, a location of a line feature in the map view, etc.

Labels (230A, 230B, 230C, 230D), in one or more embodiments of the disclosure, are used as identifiers and/or descriptors of the line features (220A, 220B, 220C, 220D). In the example of FIG. 2A, labels A, B, and C (230A, 230B, 230C) provide additional details associated with the class C airspace indicated by line features A, B, and C (220A, 220B, 220C). Specifically, label A (230A) indicates that the class C airspace identified by line features A (220A) reaches from 2,400' to 4,300'; label B (230B) indicates that the class C airspace identified by line features A (220B) reaches from ground to 4,300'; and label C (230C) indicates that the class C airspace identified by line features C (220C) reaches from 2,000' to 4,300'. Similarly, label D (230D) indicates that the class D airspace identified by line feature D (220D) reaches from ground to 2,900'.

In one or more embodiments, the labels are placed in an optimized manner to achieve a high degree of legibility of the map view. To achieve a high degree of legibility, exactly one label may be shown per line feature to be labeled in the map view in accordance with at least some embodiments. Using one rather than multiple labels per line feature may reduce clutter in the map view. Further, the location of the label may be chosen to improve legibility.

Figure 2B:
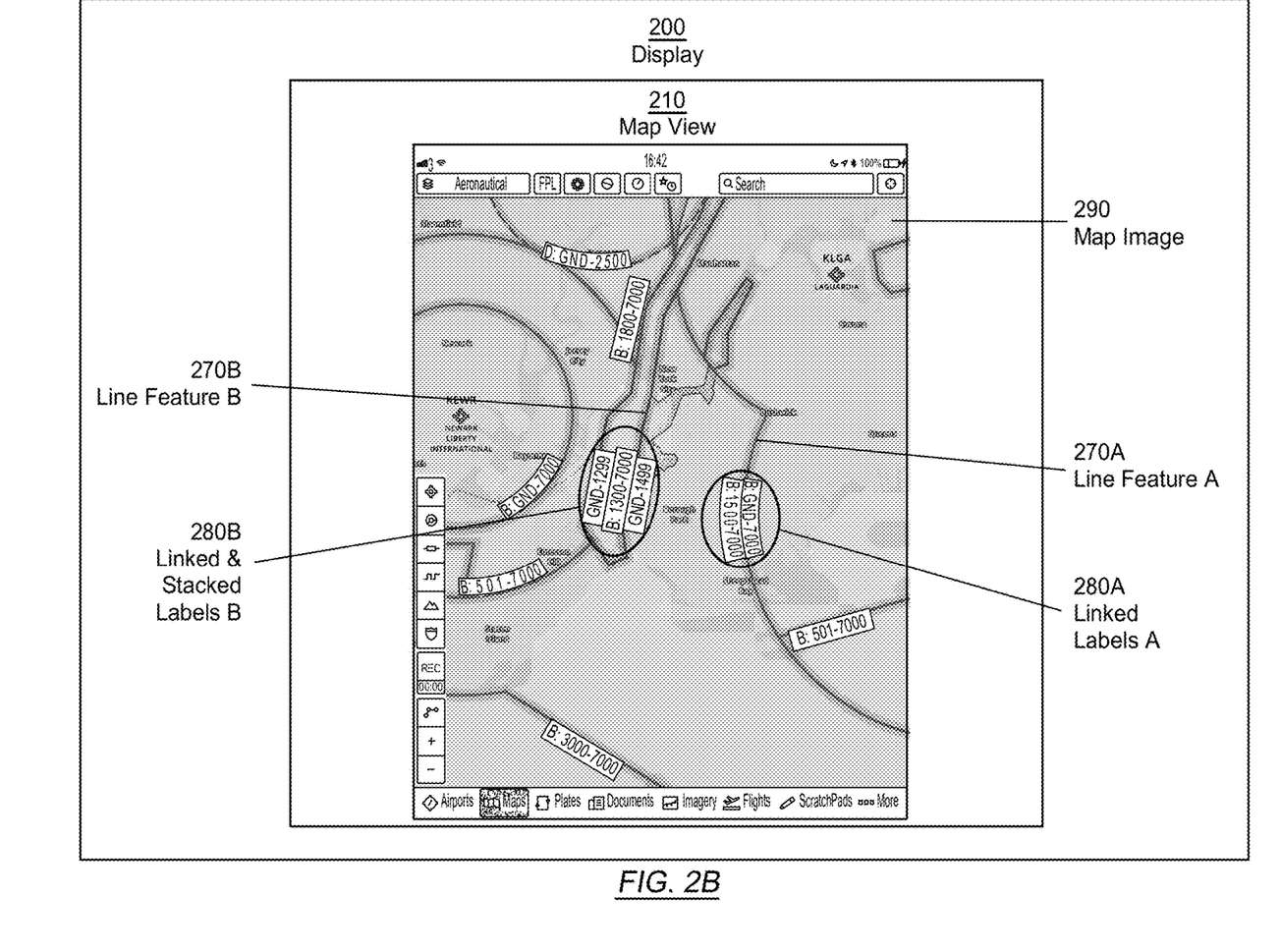

Turning to FIG. 2B, a second example of a display (200) showing a map view (210), in accordance with one or more embodiments, is illustrated. The map view (210) represents a section of a map image (290) that is displayed in the display (200). Two line features (270A, 270B), and associated labels (280A, 280B) are superimposed.

The label (280A) includes two linked labels. The labels are linked because the locations of the individual labels would have been in close proximity to one another, on opposite sides of the associated line feature (270A). The linking of the labels preserves the layout of the labels being shown on opposite sides of the line feature, while reducing clutter.

The label (280B) includes three labels. Two labels are linked, on opposite sides of the line feature (270B), and an additional label is stacked. A stacked label is a label whose candidate position is in proximity to an existing label, and on the same side of the line feature. This may occur when multiple line features follow the same physical course. Analogous to the linking of labels, the stacking of labels reduces clutter.

Additional criteria that may result in a high degree of legibility may be considered, as subsequently discussed in the description of the methods used for the labeling.

FIGS. 3, 4, 5, 6, and 7 show flowcharts in accordance with one or more embodiments of the disclosure. While the various steps in these flowcharts are presented and described sequentially, one of ordinary skill will appreciate that some or all of these steps may be executed in different orders, may be combined or omitted, and some or all of the steps may be executed in parallel. In one embodiment of the disclosure, the steps shown in FIGS. 3, 4, 5, 6, and 7 may be performed in parallel with any other steps shown in FIGS. 3, 4, 5, 6, and 7, without departing from the disclosure.

The methods of FIGS. 3, 4, 5, 6, and 7 may be performed as a map view is repeatedly rendered. During the repeated rendering, the map view may change. The change of the map view may include a movement within the underlying map, as a result of self-movement or as a result of a pan operation.

Further, the map view may change as a result of a zoom in or zoom out operation. As the map view changes, the line features that are visible in the map view may require an updating.

Figure 3:
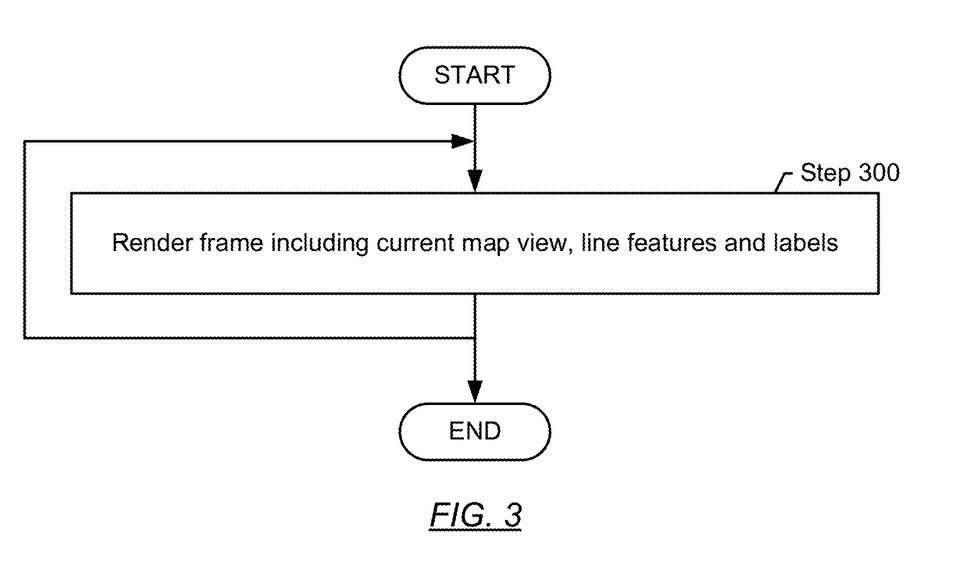
FIG. 3 shows a flowchart describing a method for rendering a frame showing a current map view, line features and labels to be displayed, in accordance with one or more embodiments of the disclosure.

FIG. 3 describes a method for rendering a frame that includes a map view, line features, and labels. The rendered frame may subsequently be shown in a display.

In Step 300, the frame is rendered based on content obtained from the map repository, such as image data of a map, and line features of the map, and further based on an input obtained from the label placement engine. The input from the label placement engine may include labels associated with the line features that are displayed in the frame. The labels provided by the label placement engine may be obtained as described below with reference to FIGS. 4, 5, 6, and 7.

The rendering may be periodically performed at a set frequency, which may be governed by the screen refresh frequency of the display (e.g., 30 Hz, or any other screen refresh frequency). The rendering may include superimposing multiple layers of image data on each other. One layer may be dedicated to basic map content such as geographic information, and a superimposed layer may be dedicated to line features, and another superimposed layer may be dedicated to labels, etc. During the rendering, additional operations may be performed, including font and/or symbol scaling in a zoom-level dependent manner, adjustment of the transparency of layers to ensure readability and/or switching display modes between daytime and nighttime operation. Aspects of the rendering may be controlled by input provided by the user. More specifically, a user may select a particular map segment, zoom into or out of a map, thereby adjusting the map view being rendered. A user may further activate or deactivate layers to show or hide details to be rendered, etc. The map view being rendered may also be affected by a signal of the GPS sensor specifying a current location, which may be used to center the map view.

Figure 4:
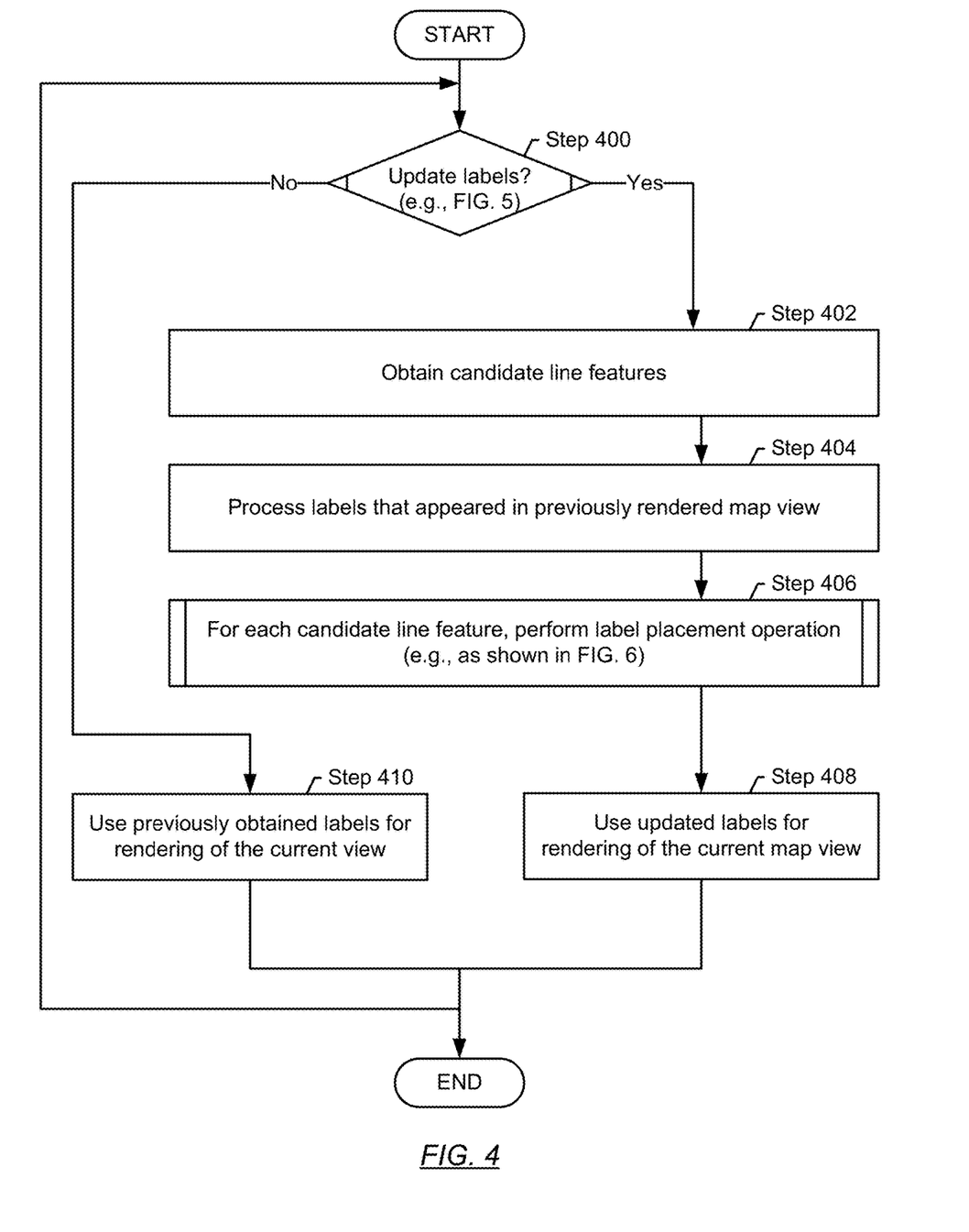
FIG. 4 shows a flowchart describing a method for updating a labeling of a previously rendered map view to obtain a labeling for a current map view to be rendered, in accordance with one or more embodiments of the disclosure.

FIG. 4 shows a flowchart describing a method for updating a labeling of a previously rendered map view to obtain a labeling for a current map view to be rendered, in accordance with one or more embodiments of the disclosure. The labels obtained as described in FIG. 4 may be used for the rendering of a frame, as described in FIG. 3. The method of FIG. 4 may be periodically performed, whenever an updating of the labels is triggered.

In Step 400, it is determined whether labels are to be updated. The determination may be made based on whether various conditions are met, as described in FIG. 5. If an updating of the labels is triggered, the execution of the method may proceed with Step 402. If an updating of the labels is not triggered, the execution of the method may proceed with Step 410.

In Step 402, candidate line features are obtained. A candidate line feature may be any line feature to be labeled. Any line feature for which associated labeling data is available may be a candidate line feature. Only line features that appear, at least partially, within the current map view to be rendered may be considered candidate line features. This may be tested using the line feature data describing the geometry of the line features. The line feature data may be compared against coordinates delimiting the current map view. If the line feature data indicates that at least part of a line feature is within the current map view, the line feature may be considered for further processing. Line features that are not extending into the current map view may be ignored.

Whether a line feature appears in the current map view may also depend on various factors, such as the zoom level (when zooming out, small line features and/or line features of certain types with a lower significance may no longer be displayed), user settings (a user may choose to show or not show certain types of line features), etc. In addition, a line feature may qualify as a candidate line feature only if the line feature is sufficiently large, in the current map view. A line feature may be sufficiently large if it has a significant length (i.e., length greater than a threshold). In one embodiment, the threshold is defined by the ratio of the length of the line feature (e.g., in nautical miles) to the scale of the current map view (also in nautical miles). Assume, for example, that the threshold is 0.8. In the example, in a current map view that is 100 nautical miles wide, the line feature needs to be 80 nautical miles long in order for the line feature to be considered as a candidate for label placement. Line features less than 80 nautical miles long are not candidates for labeling, in the example. Other size thresholds may be used without departing from the disclosure. The obtained candidate line features may be stored in a list.

Each of the candidate line features obtained in Step 402 may be assigned a priority. One approach to assign a priority may be based on the size or length of the line feature to the extent that the line feature is visible in the map view. Larger line features may be assigned a higher priority than smaller line features. Consider the example of FIG. 2A. Here, line feature C (220C) is assigned a higher priority than line feature D (220D), based on size. Further, to determine the priority of a line feature, the line feature's relevance may be considered. Relevance may be specific to a particular type of map or application. For example, in an aeronautical chart, the relevance of an airspace boundary may be considerably higher than the relevance of a river. Accordingly, assigning a label identifying the airspace boundary may be assigned a higher priority than assigning a label identifying the river.

In Step 404, labels that appeared in a previously rendered map view are processed. The processing may result in these previous labels also being displayed in the current map view, or in these previous labels not being displayed. Whether previous labels are displayed in the current map view is determined as follows.

A previous label may be recognized based on having been displayed during the previous execution of the method of FIG. 4. A previous label may no longer be displayed in the current map view if the associated line feature is not one of the candidate line features obtained in Step 402. Further, a previous label may no longer be displayed if the previous label is no longer visible in the current view. The previous label may no longer be visible when the map view moves relative to the underlying map. A previous label that is only partially visible due to being cut off at the edge of the current map may also be removed.

A previous label may also no longer be displayed if the previous label, in the current map view, spatially conflicts with another label, such as a label in close proximity or a label that spatially overlaps. If two previous labels associated with line features that have different priorities overlap, the previous label associated with the lower priority line feature may be removed. A previous label that is removed may, however, be reintroduced at a different location when Step 406 is executed. Previous labels to which none of the above applies may be displayed in the current map view. The locations of these labels in the current map view may remain unchanged, relative to the associated features.

In Step 406, a label placement operation is performed for each of the candidate line features obtained in Step 402. The label placement operation is described below with reference to FIG. 6. The label placement operation may be used to determine locations for the labels relative to the associated line features, in the map view.

In Step 408, based on the execution of Steps 402-406, updated labels may be used for a subsequently performed rendering of the current map view. The updated labels may include the labels whose locations were determined as described in Step 406, and labels that were present in a previously rendered map view as described in Step 404.

In Step 410, based on bypassing the execution of Step 402-406, the previous labels, present in the previously rendered map view, may be used for a subsequently performed rendering of the current map view.

Figure 5:
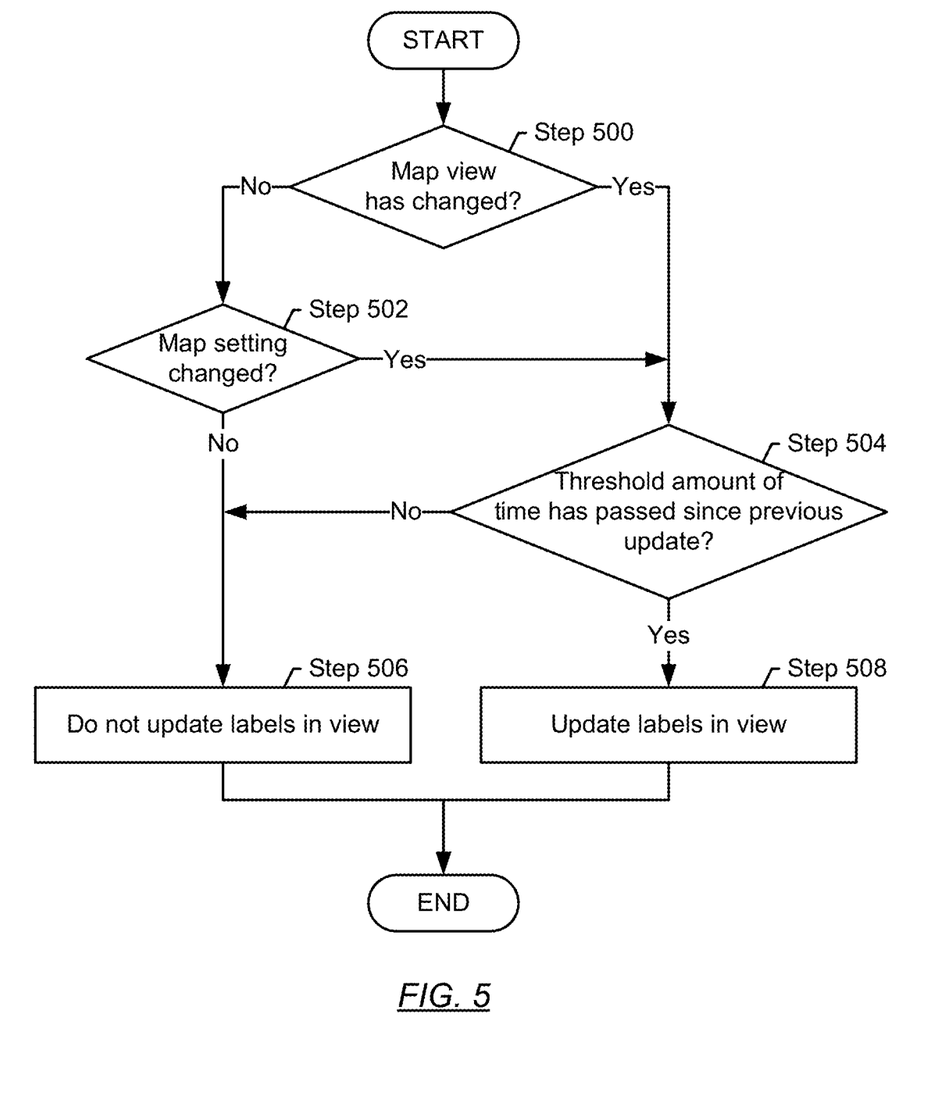
FIG. 5 shows a flowchart describing a method for determining whether the updating of the labels of the line features is to be performed, in accordance with one or more embodiments of the disclosure.

Turning to FIG. 5 a flowchart describing a method for determining whether the updating of the labels of the line features is to be performed, is shown.

In Step 500, a test is performed to determine whether the current map view is different from the previously rendered map view. The map view may have changed for various reasons. For example, the user may have performed a zoom or pan operation, or the map view may have been re-centered, based on self-movement. If the current map view is identical to the previously rendered map view, the execution of the method may proceed with Step 502. Alternatively, if the current map view is different from the previously rendered map view, the execution of the method may proceed with Step 504.

In Step 502, it is determined whether a map setting has changed. A map setting may be any setting that affects the labels that are to be shown in the map view. Changed map settings that may result in a change of the labels to be displayed include, but are not limited to, the activation or deactivation of types of line features to be shown, and the activation or deactivation of the labeling for certain types of line features. If no map settings have changed, the method may proceed with the execution of Step 506 to conclude that no updating of the labels is to be performed. If map settings have changed, the method may proceed with the execution of Step 504.

In Step 504, it is determined whether a threshold amount of time has elapsed since the previous updating of the labels. For example, the threshold time interval may be 350 ms. The threshold time interval may be set to ensure that an overly frequent updating of the labels in the map view is avoided and/or that a sufficient number of labels that are candidates for updating their positions is available. If the time that has passed is below the specified time interval, the execution of the method may proceed with Step 506. If the time that has passed reaches or exceeds the specified time interval, the execution of the method may proceed with Step 508 to conclude that an updating of the labels is to be performed.

Figure 6:
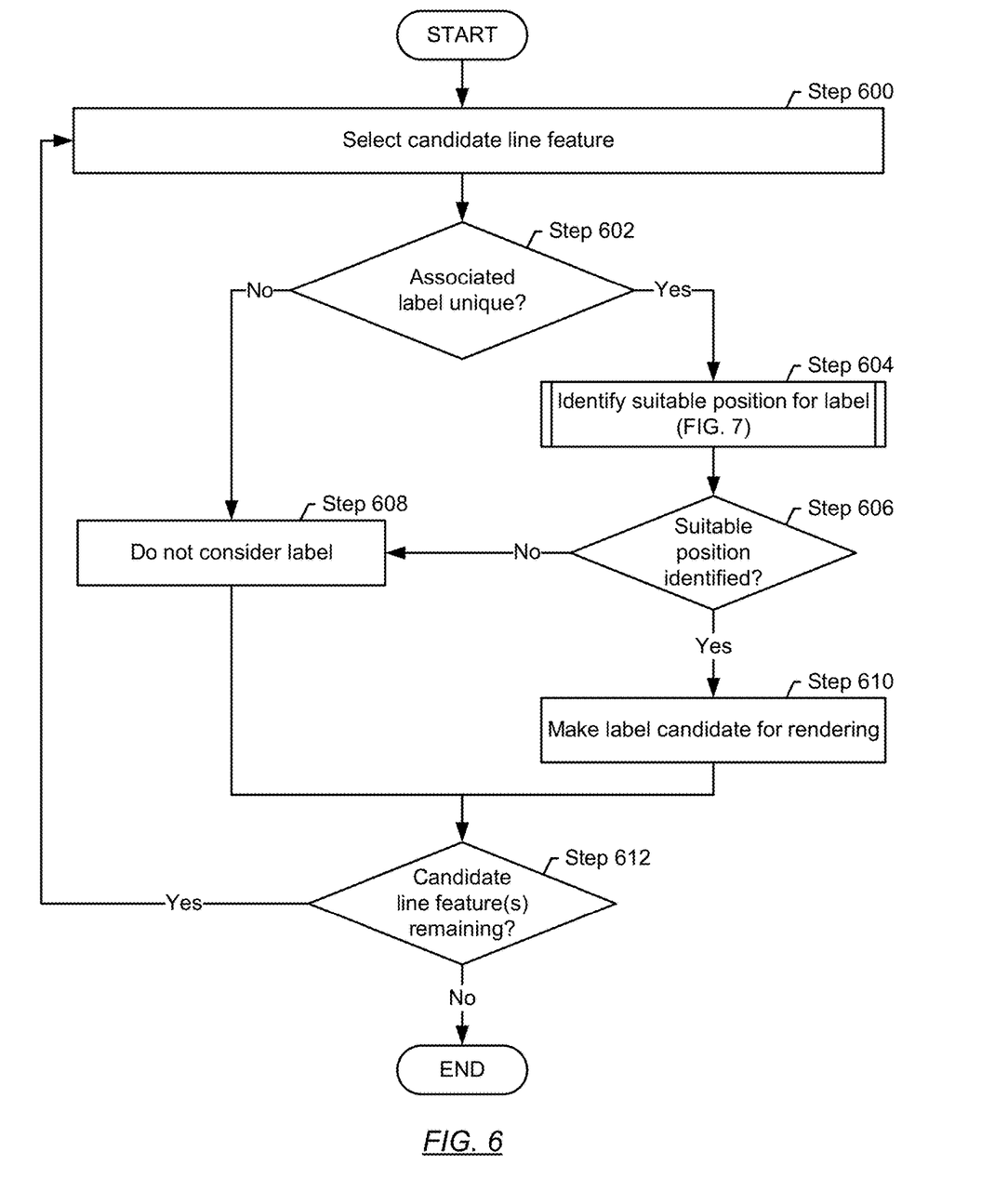
FIG. 6 shows a flowchart describing a method for performing a label placement operation, in accordance with one or more embodiments of the disclosure.

Turning to FIG. 6, a flowchart describing a method for performing a label placement operation is shown. The method of FIG. 6 may be executed for a number of candidate line features. Accordingly, as shown in FIG. 6, the method may be implemented as a loop to process the candidate line features. The candidate line features may be processed sequentially or in parallel.

In Step 600, a candidate line feature is selected for further processing. Any one of the candidate line features may be selected. If priorities are assigned to the candidate line features, the candidate line feature with the highest priority may be selected.

In Step 602, a test for the uniqueness of the label associated with the candidate line feature is performed. A unique label, in accordance with one embodiment, is a label that is to be present only once in the current map view. The test for uniqueness may be performed based on the content of the labels (e.g., textual and/or symbolic content), or based on identifiers that uniquely identify the labels. The test for uniqueness may ensure that a label is to be displayed only once in the current map view, even if multiple line features would produce identical labels. If the label is not unique, the execution of the method may proceed with Step 608 to not consider the label for rendering in the current map view. A label that is no longer considered for rendering may be reconsidered for rendering during the next updating of the labeling for a future map view, at a later time. If the label is found to be unique, the execution of the method may proceed with Step 604.

Figure 7:
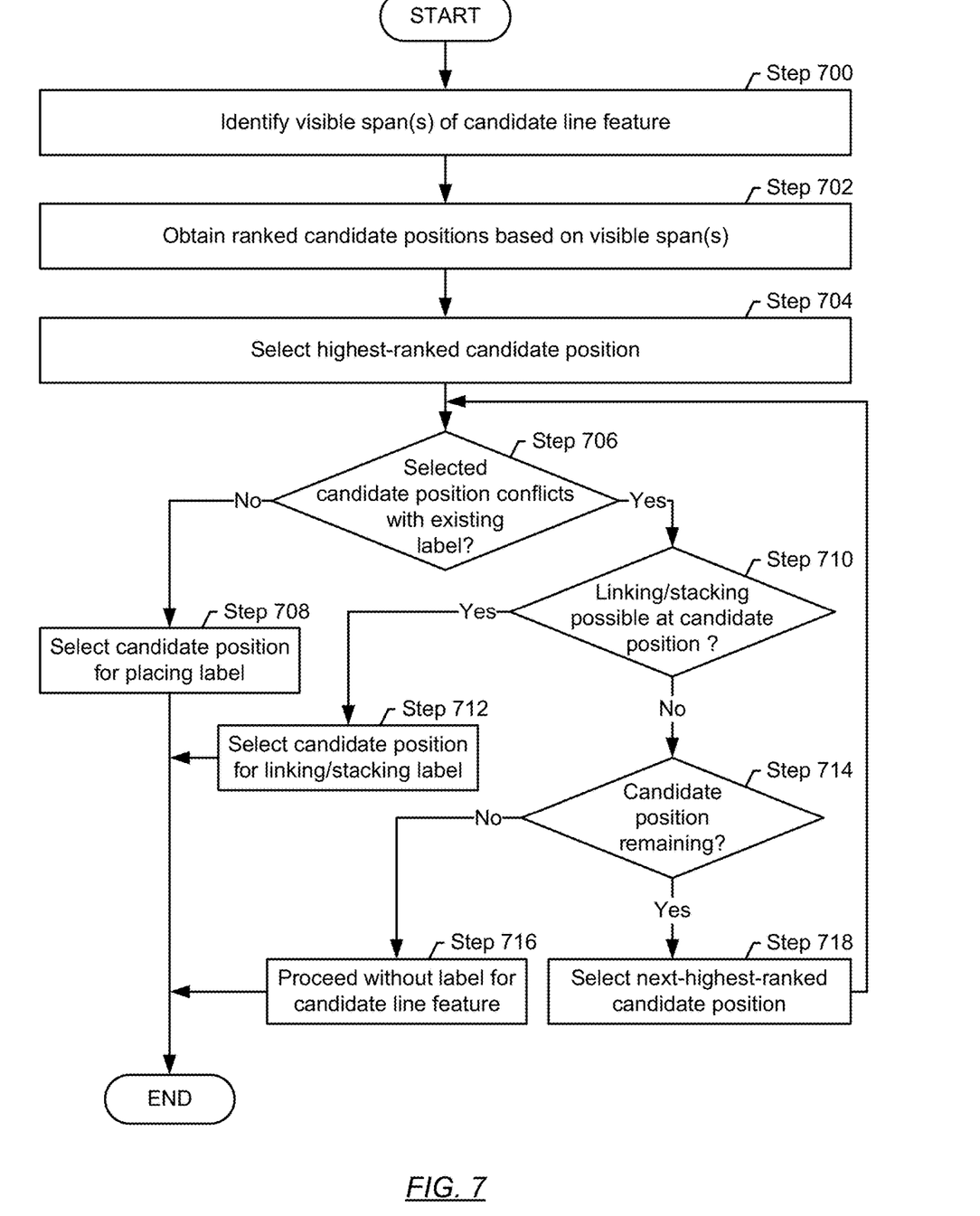
FIG. 7 shows a flowchart describing a method for identifying positions for the labels of the line features, in accordance with one or more embodiments of the disclosure.

In Step 604, a suitable position for the label is identified, as described in FIG. 7.

In Step 606, a test is performed to check whether a suitable position for the label was identified, based on the execution of Step 604. If no suitable position was identified, the execution of the method may proceed with Step 608 to not consider the label for rendering in the current map view. If a suitable position was identified, the execution of the method may proceed with Step 610 to make the label a candidate for rendering in the current map view.

In Step 612, a test is performed to check whether candidate line features are remaining for label placement. If candidate line features are remaining, the execution of the method may proceed with Step 600 to process the remaining candidate line features. The candidate line feature with the next-highest priority may be selected. If no candidate line features are remaining, the execution of the method may terminate.

Turning to FIG. 7, a flowchart describing a method for identifying a position for a label associated with a candidate line feature is shown. The method attempts to identify the most ideal position for the label in the map view, based on various constraints that may be present. The possible outcomes resulting from execution of the method are that either a position for the label is identified, or not.

In Step 700, one or more visible spans of the candidate line feature are identified. A visible span of a line feature may be a segment of the line feature that is visible in the map view to be rendered. A single line feature may include multiple visible spans if part of the line feature extends beyond the map view. Consider, for example, a meandering river. A first visible span may be separated from a second visible span by a part of the meandering river that is outside of the view to be rendered. In one or more embodiments, the identification of the visible spans is performed in a predictive manner. Since a map view can be dynamic (in motion) due to user interaction, or the map view may be centered on an object that is in motion, the map view predicted for a time in the future (e.g., 0.5 seconds forward) may be used for identifying the visible spans. Using motion prediction, labels for candidate line features are more likely to be placed at locations that increase the time in view (before disappearing due to reaching an edge of the map view). By predictively performing the labeling to accommodate motion of the current map view in the electronic map over time, legibility may, thus, be increased, as a result of a reduced frequency of distracting visual changes associated with relocating labels during the motion.

In Step 702, ranked candidate positions for a label to be placed are obtained, based on the one or more visible spans. A position on a longer visible span may be ranked higher than a position on a shorter visible span. Further, candidate positions may be spaced equally along a visible span, with candidate positions at the center of the visible span being ranked higher than candidate positions toward the periphery of the visible span. Accordingly, higher-ranked candidate position tend to be toward the center of the current map view, whereas lower-ranked candidate positions tend to be at the periphery of the current map view.

In Step 704, the optimally ranked candidate position is selected for the label placement. The optimally ranked candidate position may be the candidate position having the highest ranking, if the ranking is from highest to lowest.

In Step 706, a spatial conflict test is performed to determine whether the selected candidate position spatially conflicts with an existing label in the current map view to be rendered. The existing labels considered for the spatial conflict test include labels that are "inherited" from a previously rendered map view as described in Step 404 of FIG. 4, and also labels for which a location is determined during the present execution of the methods of FIGS. 4, 5, 6, and 7 for the current map view. A spatial conflict may exist if the label to be placed overlaps with or is in close proximity to an existing label, thereby affecting legibility. A label is within close proximity when the label is within a threshold distance. If no conflict is detected, the execution of the method may proceed with Step 708 to select the candidate position as the position for placing the label in the current map view to be rendered. If a conflict is detected, the execution of the method may proceed with Step 710.

In Step 710, a test is performed to determine whether, in presence of the conflict, the conflicting labels may be linked or stacked, at the candidate position. Linking or stacking labels may enable the displaying of two or more labels using limited space in the map view. A stacking depth may be limited to, for example, no more than three labels. If a linking or stacking is found to be possible, the execution of the method may proceed with Step 712. Otherwise, the execution of the method may proceed with Step 714.

In Step 712, the candidate position is selected for linking or stacking the label.

In Step 714, a test is performed to determine whether another candidate position for the label to be placed is remaining. If no candidate position is remaining, the execution of the method may proceed with Step 716, where the execution of the method of FIG. 7 is terminated without a position for the label to be placed having been identified. If a candidate position is remaining, the execution of the method may proceed with Step 718 to select the next-highest ranked candidate position to repeat Steps 706-718. Repeated execution may thus result in increasingly less ideal candidate positions being considered for the placement of the label.

Some embodiments of the disclosure may have one or more of the following advantages. At least some embodiments of the disclosure provide map views that are clear and easy to read. Repetitive labels, overlapping labels, and truncated labels at the edges of the map view are avoided, to reduce clutter. At least some embodiments of the disclosure may also provide computational improvements, including a smoother animation of moving map views that is more responsive to user interaction and that involves a lower computational processing cost, as a result of the efficient computation of less dense, cleaner map views.

Figure 8A:
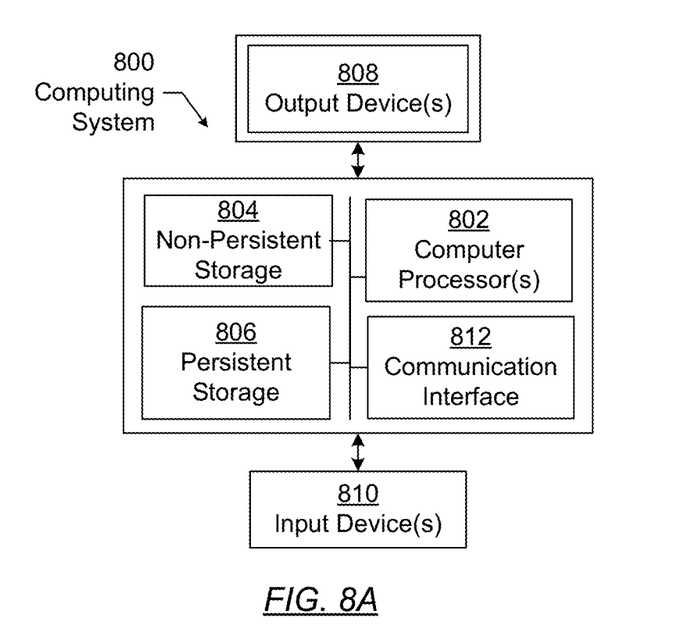
FIGS. 8A and 8B show computing systems in accordance with one or more embodiments of the disclosures.

Embodiments of the disclosure may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 8B:
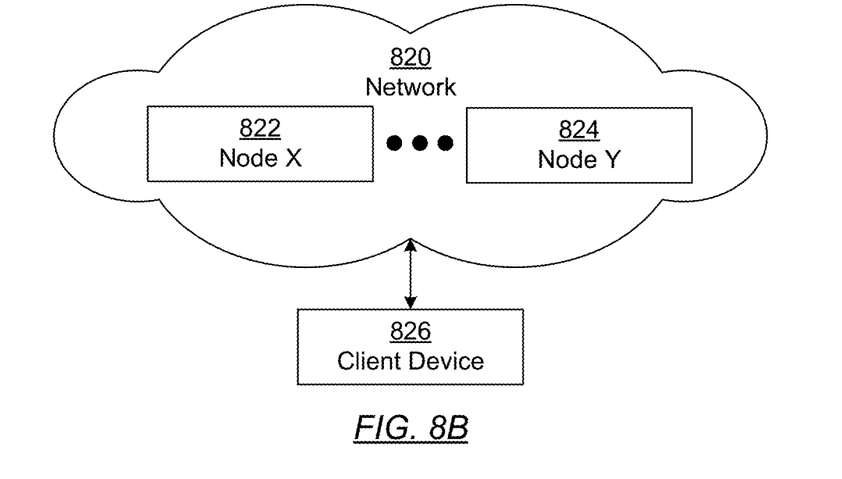

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the disclosure.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 8A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the disclosure.

While the disclosed technology has been described with respect to a limited number of embodiments, those skilled in the art, having benefit of this disclosed technology, will appreciate that other embodiments can be devised which do not depart from the scope of the disclosed technology as disclosed herein. Accordingly, the scope of the disclosed technology should be limited only by the attached claims.

What is claimed is:

1. A method for labeling line features in an electronic map, the method comprising:
   updating, by a computer processor, a labeling of a previously rendered map view to obtain a labeling for a current map view, comprising:
      obtaining a plurality of candidate line features associated with the current map view;
      for a first candidate line feature of the plurality of candidate line features, making a first determination that a first label associated with the first candidate line feature is unique in the current map view;
      based on the first determination:
         identifying at least one visible span of the first candidate line feature, based on the at least one visible span, obtaining a plurality of ranked candidate positions for the first label, and selecting, from the plurality of ranked candidate positions, a first position for the first label in the current map view; and rendering, by the computer processor, a frame for a display, the frame comprising the current map view, the plurality of candidate line features, and the first label at the first position.

2. The method of claim 1, further comprising performing the updating of the labeling based on a determination that a threshold amount of time has passed since a previous updating of the labeling.

3. The method of claim 1, further comprising performing the updating of the labeling based on a determination that the current map view is different from the previously rendered map view.

4. The method of claim 1, wherein the updating of the labeling further comprises:

for a second candidate line feature of the plurality of candidate line features, making a second determination that a second label associated with the second candidate line feature is not unique in the current map view to be rendered; and based on the second determination, not identifying a second position in the current map view, for the second label.

5. The method of claim 1, wherein obtaining the plurality of candidate line features comprises:

identifying a line feature of the electronic map;

determining that the identified line feature appears, at least partially, within the current map view; and determining that the identified line feature satisfies a size threshold, within the current map view.

6. The method of claim 1, wherein the updating of the labeling further comprises:

removing a previous label appearing in the previously rendered map view based on a determination that a line feature associated with the previous label is not a member of the plurality of candidate line features.

7. The method of claim 1, wherein the updating of the labeling further comprises:

removing a previous label appearing in the previously rendered map view based on a determination that the previous label, in the current map view, spatially conflicts with another label or with an edge of the current map view.

8. The method of claim 7, further comprising updating the labeling for a future rendered map view by:

making the removed previous label a candidate line feature; and placing the removed previous label at a non-conflicting location in the future rendered map view.

9. The method of claim 1, wherein the first position is an optimally ranked candidate position that does not spatially conflict with other labels in the current map view.

10. The method of claim 1, wherein identifying the first position comprises:

determining that the first position spatially conflicts with a second label in the current map view; and determining that the first label and the second label are linkable or stackable; and obtaining the first position for linking or stacking the first label and the second label.

11. The method of claim 1, wherein each of the plurality of ranked candidate positions for the first label is ranked based on at least one selected from:

a length of the visible span associated with the candidate position; and a centrality of the candidate position relative to the associated visible span.

12. The method of claim 1, wherein the updating of the labeling of the previously rendered map view to obtain the labeling for the current map view is performed predictively in a direction accommodating motion of the current map view in the electronic map over time.

13. A system for labeling line features in an electronic map, the system comprising:

a computer processor; and instructions executing on the computer processor, causing the system to:

update a labeling of a previously rendered map view to obtain a labeling for a current map view, comprising:

obtaining a plurality of candidate line features associated with the current map view, for a first candidate line feature of the plurality of candidate line features, making a first determination that a first label associated with the first candidate line feature is unique in the current map view, and based on the first determination:

identifying at least one visible span of the first candidate line feature, based on the at least one visible span, obtaining a plurality of ranked candidate positions for the first label, and selecting, from the plurality of ranked candidate positions, a first position for the first label in the current map view; and render a frame for a display, the frame comprising the current map view, the plurality of candidate line features, and the first label at the first position.

14. The system of claim 13, wherein obtaining the plurality of candidate line features comprises:

identifying a line feature of the electronic map;

determining that the identified line feature appears, at least partially, within the current map view; and determining that the identified line feature satisfies a size threshold, within the current map view.

15. The system of claim 13, wherein the first position is an optimally ranked candidate position that does not spatially conflict with other labels in the current map view.

16. A non-transitory computer readable medium comprising computer readable program code for causing a computer system to:

update a labeling of a previously rendered map view to obtain a labeling for a current map view, comprising:

obtaining a plurality of candidate line features associated with the current map view, for a first candidate line feature of the plurality of candidate line features, making a first determination that a first label associated with the first candidate line feature is unique in the current map view, and based on the first determination:

identifying at least one visible span of the first candidate line feature, based on the at least one visible span, obtaining a plurality of ranked candidate positions for the first label, and selecting, from the plurality of ranked candidate positions, a first position for the first label in the current map view; and render a frame for a display, the frame comprising the current map view, the plurality of candidate line features, and the first label at the first position.

17. The non-transitory computer readable medium of claim 16, wherein the updating of the labeling further comprises:

for a second candidate line feature of the plurality of candidate line features, making a second determination that a second label associated with the second candidate line feature is not unique in the current map view to be rendered; and based on the second determination, not identifying a second position in the current map view, for the second label.

18. The non-transitory computer readable medium of claim 16, wherein obtaining the plurality of candidate line features comprises:

identifying a line feature of the electronic map;

determining that the identified line feature appears, at least partially, within the current map view; and determining that the identified line feature satisfies a size threshold, within the current map view.

19. The non-transitory computer readable medium of claim 16, wherein the first position is an optimally ranked candidate position that does not spatially conflict with other labels in the current map view.

20. The non-transitory computer readable medium of claim 16, wherein identifying the first position comprises:

determining that the first position spatially conflicts with a second label in the current map view; and determining that the first label and the second label are linkable or stackable; and obtaining the first position for linking or stacking the first label and the second label.

* * * * *